United States Patent
Whelan et al.

(10) Patent No.: US 6,525,439 B2
(45) Date of Patent: Feb. 25, 2003

(54) ELECTRIC MOTOR END PLATE ASSEMBLY WITH INTEGRATED MOTOR DRIVER TRANSISTOR

(75) Inventors: Gary P. Whelan, South Lyon, MI (US); Fred W. Sauer, Eagan, MN (US)

(73) Assignee: Kelsey-Hayes Company, Livonia, MI (US)

(*) Notice: Subject to any disclaimer, the term of this patent is extended or adjusted under 35 U.S.C. 154(b) by 0 days.

(21) Appl. No.: 09/918,304

(22) Filed: Jul. 30, 2001

(65) Prior Publication Data

US 2003/0020343 A1 Jan. 30, 2003

(51) Int. Cl.[7] .................. H02K 11/00; H02K 5/00
(52) U.S. Cl. .................. 310/68 R; 310/71; 310/89; 310/239
(58) Field of Search .................. 310/68 R, 71, 310/67 R, 72, 68 A, 43, 89, 239, 249

(56) References Cited

U.S. PATENT DOCUMENTS

| | | | | |
|---|---|---|---|---|
| 3,809,935 A | * | 5/1974 | Kristen et al. | 310/68 |
| 5,006,765 A | * | 4/1991 | Schmider | 310/71 |
| 5,027,021 A | * | 6/1991 | Tsuchida | 310/68 A |
| 5,196,747 A | * | 3/1993 | Kress et al. | 310/89 |
| 5,688,028 A | | 11/1997 | Kohno et al. | |
| 5,853,231 A | | 12/1998 | Iwamura et al. | |
| 5,957,547 A | | 9/1999 | Schliebe et al. | |
| 6,078,117 A1 | * | 6/2002 | Perrin et al. | 310/68 R |

* cited by examiner

Primary Examiner—Thanh Lam
(74) Attorney, Agent, or Firm—MacMillan, Sobanski & Todd, LLC

(57) ABSTRACT

An electric motor has a housing closed at one end by an end plate assembly including a motor driver transistor. The transistor is mounted on a disk and is connected to brushes by lead frames that have ends terminating in a projection integral for connection to an electronic control unit associated with the motor.

22 Claims, 5 Drawing Sheets

ELECTRIC MOTOR END PLATE ASSEMBLY WITH INTEGRATED MOTOR DRIVER TRANSISTOR

BACKGROUND OF THE INVENTION

The present invention relates generally to electric motors with motor driver transistors and, in particular, to an electric motor with an integrated motor driver transistor.

Electric motor drivers that utilize electronic switching devices such as transistors, for control, are well known in the art. Motor driver transistors have generally been installed remotely from the electric motor to which they are connected. A typical location for a motor driver transistor is in the Electronic Control Unit (ECU) of the system of which the motor is a part. An example of such a system is an automobile ABS braking system. The ECU functions to control the operation of the system, including the operation of the electric motor which may be attached to a hydraulic pump or the like. Locating the motor driver transistor on the ECU poses a number of inherent problems, including greater difficulty in managing the electric current through the ECU. Another problem is the difficulty in dissipating the heat generated by the combined electronic components of the ECU and the motor driver transistor; the heat dissipation is necessary for the circuits of the motor driver transistor and ECU to operate within their respective safe operating zones. Yet another problem in locating the motor driver transistor on the ECU is the design condition where the power connector is located on the ECU housing. This makes the ECU housing larger in size.

It is desirable to remedy the electric current and heat load problems associated with ECUs that contain motor driver transistors. It is also desirable to reduce the size of the ECU, and further to be able to move the power connector from the ECU housing to the motor housing. It is also desirable to provide a motor diagnostic and monitoring means as part of the motor housing in order to observe the performance of the electric motor and thereby diagnose problems with motor operation.

The primary objective of the present invention is to integrate a motor driver transistor within an electric motor and thereby reduce the size and cost of the ECU. Another objective of the present invention is to integrate the power connector into the motor end plate and remove the power connector from the ECU housing, which will also reduce the size and cost of the ECU. A further objective of the present invention is to integrate a current sensing resistor and/or a motor diagnostics line with the electric motor. The ability to measure the electric motor current can enhance the performance of the motor and the electrical system of which it is a component.

SUMMARY OF THE INVENTION

The present invention achieves the objectives noted above by providing a novel electric motor end plate with an integrated motor driver transistor. By integrating the motor driver transistor as part of the motor housing end plate, the electric current control and thermal load management of the ECU can be improved.

Prior art electric motors that utilized motor driver transistors, as noted above, located the motor driver transistor remotely from the motor. The present invention incorporates the electronic switching device, or motor driver transistor, as a part of the end plate of the electric motor housing, which permits the ECU to be of a much smaller size. This novel integrated motor driver transistor allows the power connection to be moved from the ECU to the motor housing, which also permits the ECU to be of a much smaller size. In addition, the novel integrated motor driver transistor allows the motor to be fitted with at least two types of diagnostic circuits. These circuits, when connected to proper instrumentation, are able to provide better monitoring and diagnosis of the motor under operating conditions. The present invention contemplates integrating a power connector, a motor connector or both types of connectors as part of the end plate of the electric motor housing. The present invention also contemplates utilizing a field effect transistor (FET) or a bipolar junction transistor (BJT) as the motor driver transistor, but those skilled in the art will recognize that other types of electronic switching devices may be used while still remaining within the scope of the invention.

A preferred embodiment of the present invention is disclosed having an electric motor with the novel integrated motor driver transistor.

Another embodiment of the present invention is disclosed having an electric motor with the integrated motor driver transistor and an integral motor connector.

Yet another embodiment of the present invention is disclosed having an electric motor with the integrated motor driver transistor, an integral motor connector, and an integral motor diagnostics line.

Still another embodiment of the present invention is disclosed having an electric motor with the integrated motor driver transistor, an integral motor connector, and an integral current sensing resistor.

DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Figure 1:
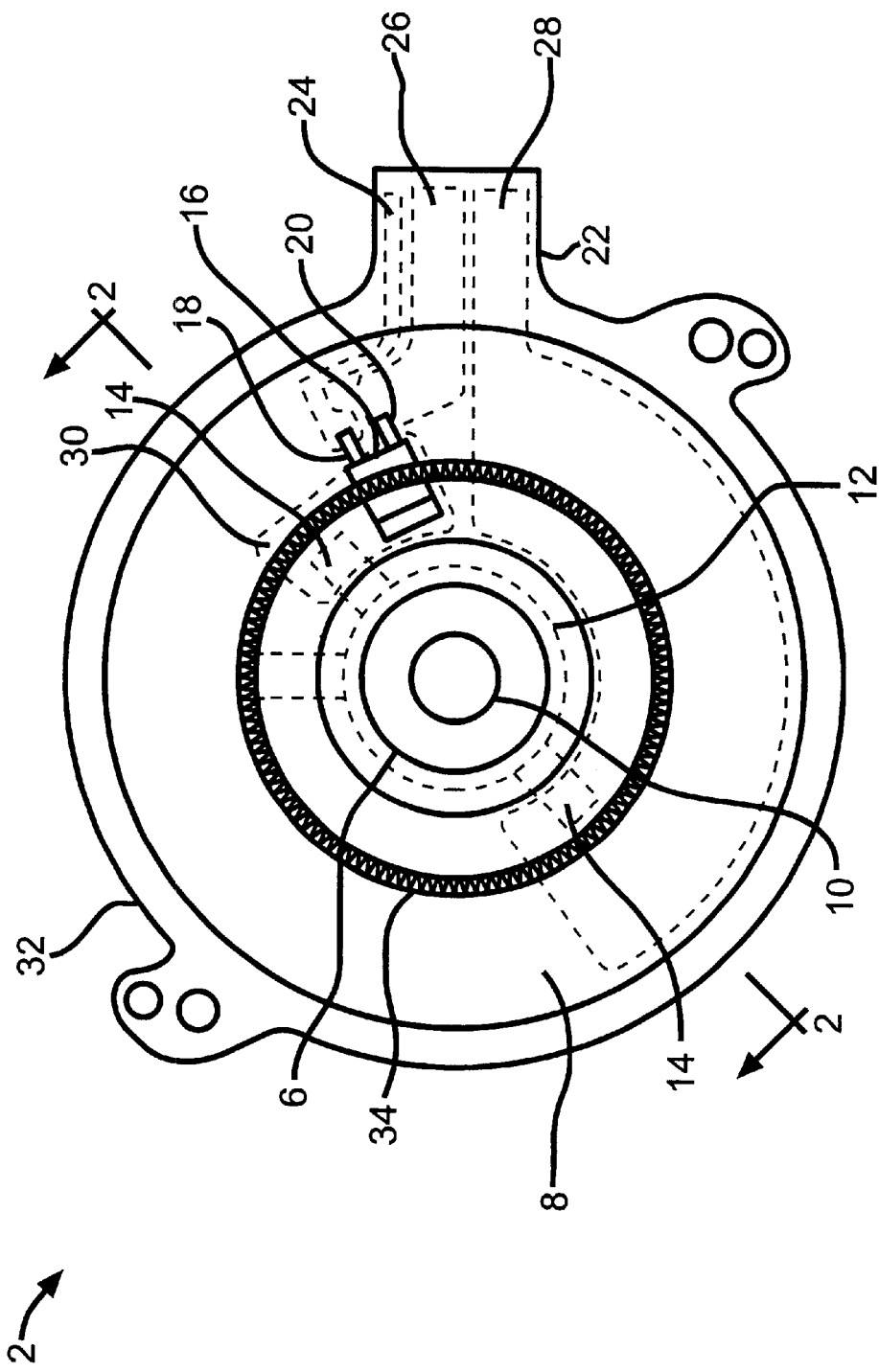
FIG. 1 is an end elevation view of an electric motor having an end plate assembly in accordance with the present invention.
Figure 2:
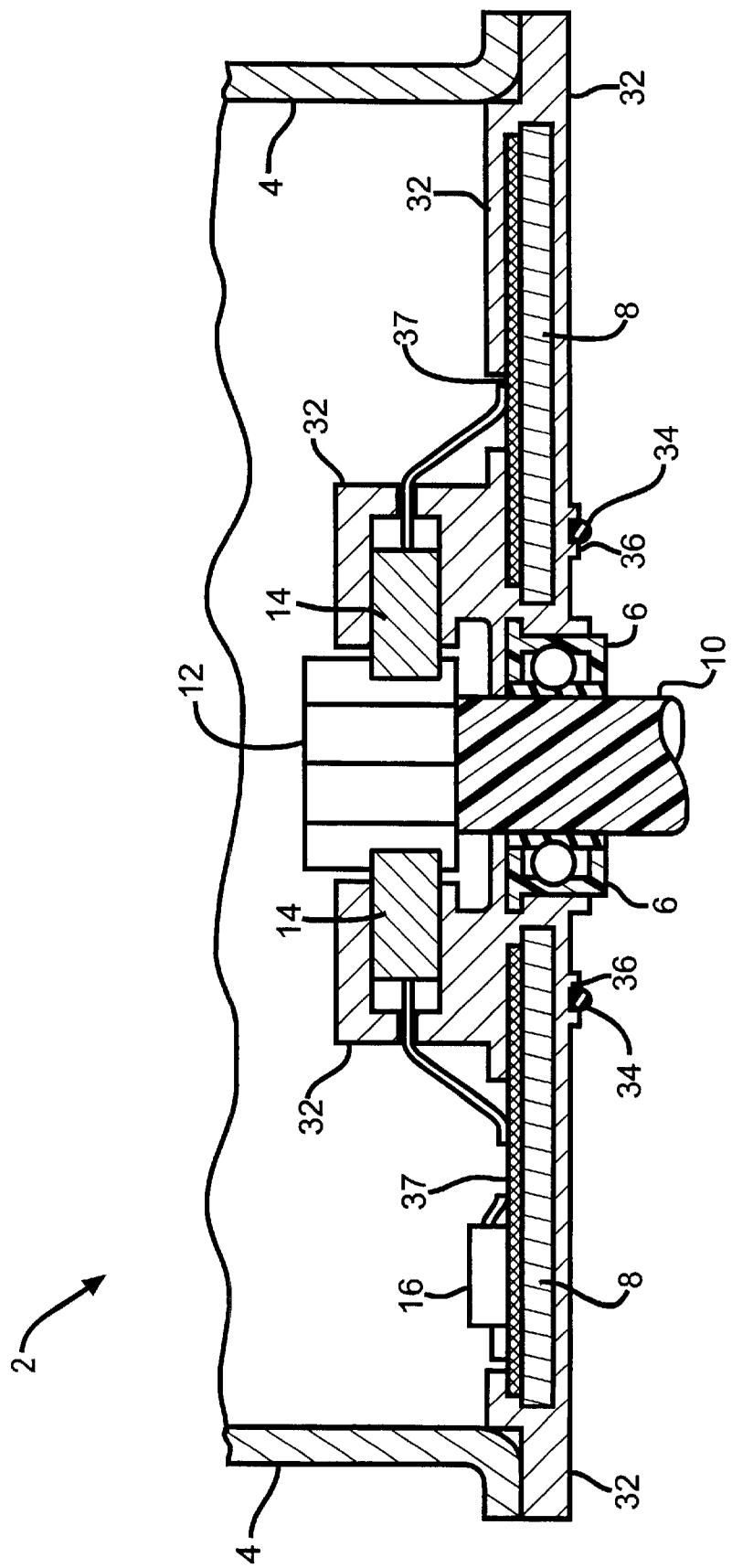
FIG. 2 is a cross-sectional view of the end plate assembly shown in FIG. 1 taken along line 2–2.

Referring to FIGS. 1 and 2, an electric motor end plate is indicated generally at 2 and includes a generally tubular housing 4 that receives a bearing 6 in one end opening. Not shown are an opposite end of the housing 4, and conventional rotor and stator components. A disk 8 with an aperture in its center is also received in the housing 4 and surrounds the bearing 6. The disk 8 serves as a heat sink for the electric motor end plate 2 and is preferably constructed of an electrically insulated yet thermally conductive material, such as aluminum with a nonconductive coating. The bearing 6, preferably of a ball or roller bearing type, rotatably supports a motor shaft 10, and a hollow, generally cylindrical motor commutator 12 receives the shaft 10 at a point farther along the axis of the shaft 10, as best seen in FIG. 2. At least two motor brushes 14 contact the circumference of the commutator 12. At least one of the brushes 14 is electrically connected to an integral motor driver transistor 16. The brushes 14 and the commutator 12 alternate fields in the rotor (not shown) to provide torque to rotate the shaft 10 in a manner well known in the art.

The motor driver transistor 16 is connected electrically in series with the commutator 12 and the brushes 14. The motor driver transistor 16 is connected electrically in series with the commutator 12 and the brushes 14. The motor driver transistor 16 has a control contact 18 and a ground contact 20. For embodiments using a field effect transistor (FET) as the motor driver transistor 16, the control contact 18, the case contact of the transistor 16 and the ground contact 20 typically are the gate, drain, and source. For embodiments using a bipolar junction transistor (BJT) as the motor driver transistor 16, the control contact 18, case contact of the transistor 16, and ground contact 20 typically are the base, collector, and emitter. The A electrical connections between the various electrical components are made by lead frames that are bonded to the disk 8 in order to dissipate the heat generated by the motor 2 and the transistor 16. The disk 8 also helps hold the lead frames in place during the plastic over-molding process mentioned below. The lead frames are flat plates shaped to fit within the housing 4 and are constructed of electrically conductive material, for example tin-plated brass or tin-plated copper. A radial projection 22 on the circumference of the motor end plate 2 contains terminal ends of at least three lead frames that provide external power and signals to the electric motor (not shown) attached to the motor end plate 2. A motor driver transistor control lead frame 24 connects an output signal from an ECU (not shown) to the control contact 18 on the motor driver transistor 16. A ground lead frame 26 connects the ground polarity of a power source, such as an automotive alternator or battery (not shown) to the ground contact 20 on the motor driver transistor 16. A positive lead frame 28 connects the positive polarity of the power source (not shown) to one of the motor brushes 14. An additional lead frame 30 connects the case contact of the motor driver transistor 16 and the other one of the brushes 14. While the electric motor end plate 2 has been shown with a radial projection 22, those skilled in the art will realize that, alternatively, the electric motor end plate 2 may not include a radial projection 22, and the lead frames 24, 26, and 28 may be attached to electric wire connections (not shown) extending from the motor end plate 2, while still remaining within the scope of the invention.

Referring now to FIG. 2, a plastic overmold or end plate 32 is formed during the construction of the motor 2 to set the various components in place after the parts have been placed in their correct positions and to provide the projection 22. The overmold/end plate 32 functions as an end wall closing the open end of the housing 4 and retaining the bearing 6 and the disk 8 while providing sliding support for the brushes 14. A lead frame 37 in FIG. 2 is shown only for the purpose of representing the axial position of the previously mentioned lead frames 24, 26, 28, or 30, relative to the metal disk 8, the motor brushes 14, and the motor driver FET 16. An O-ring 34, set in an annular channel 36 in the plastic overmold 32, seals the shaft 10 and the bearing 6 of the motor 2 when abutted against an adjacent surface (not shown) of, for example, a pump.

Figure 3:
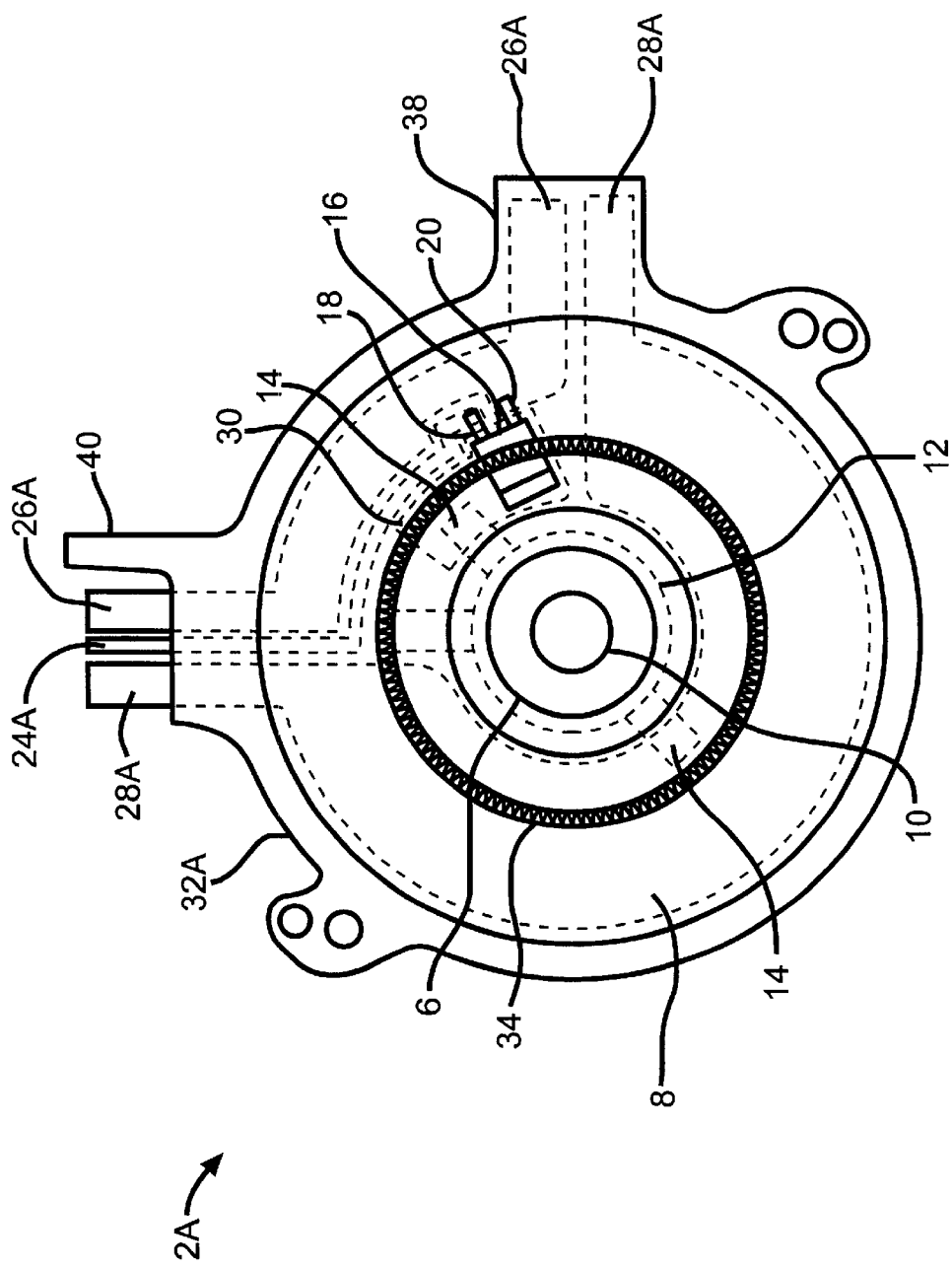
FIG. 3 is an end elevation view of a second embodiment of the electric motor shown in FIG. 1.

Referring to FIG. 3, the motor indicated generally at 2A contains many of the same elements as in FIG. 1, but further has two projections from the end plate 32A. The first projection 38, in the same location as the projection 22 in FIG. 1, is a two-pin power connector that supplies power from a power source (not shown), such as an automobile battery or alternator. The power connector 38 contains two lead frames, a ground lead frame 26A and a positive lead frame 28A, which perform the same function as the ground lead frame 26 and the positive lead frame 28 shown in FIG. 1. By locating the power connector 38 as part of the end plate 32A, the ECU (not shown) can be made smaller. A second radial projection 40 from the end plate 32A is an integral motor connector that is used to electrically connect through various lead frames the ECU (not shown) to the motor 2A. The integral motor connector 40 contains terminal ends of at least three lead frames, including the ground lead frame 26A and the positive lead frame 28A. The integral motor connector 40 further contains a motor driver transistor control lead frame 24A that connects an output signal from the ECU (not shown) to the control contact 18 on the motor driver transistor 16. While the electric motor end plate 2A has been shown with a power connector 38, those skilled in the art will realize that, alternatively, the electric motor end plate 2 may not include a radial projection 38, and the lead frames 24A, 26A, and 28A may be attached to electric wire connections (not shown) extending from the motor end plate 2, while still remaining within the scope of the invention.

Figure 4:
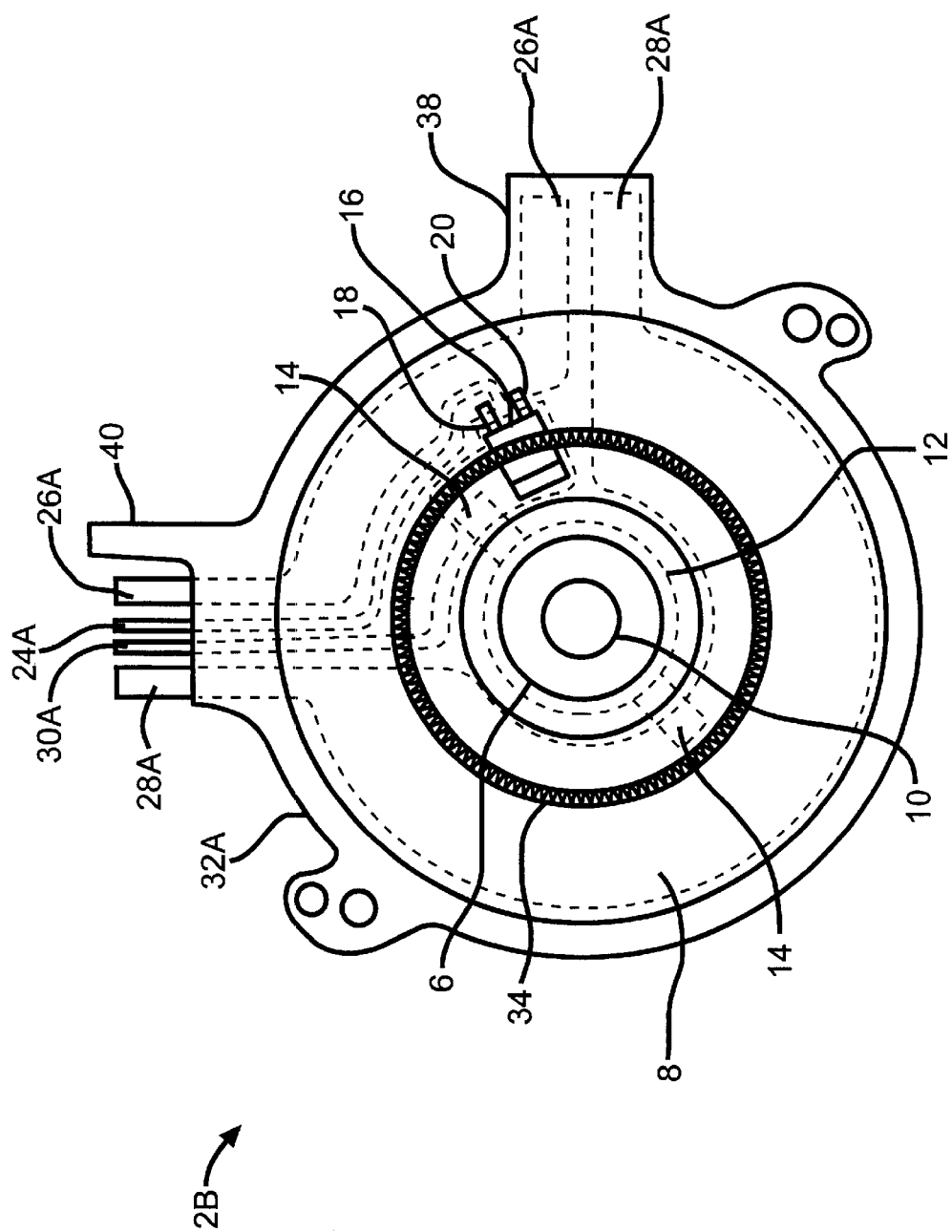
FIG. 4 is an end elevation view of a third embodiment of the electric motor shown in FIG. 1.

Referring to FIG. 4, the motor indicated generally at 2B contains many of the same elements as in FIG. 3, including the power connector 38 and the integral motor connector 40, but the integral motor connector 40 contains the ends of four lead frames. The ground lead frame 26A, the positive lead frame 28A, and the motor driver transistor control lead frame 24A perform the same function as in FIG. 3. A fourth lead frame, a motor diagnostics lead frame 30A, also extends into the projection 40 and connects the ECU (not shown) to the case contact of the motor driver FET 16. The motor diagnostics lead frame 30A also connects the motor driver FET 16 with one of the motor brushes 14. The ability to diagnose the functioning of the motor 2B during operating conditions can enhance the performance of the entire electrical system.

Figure 5:
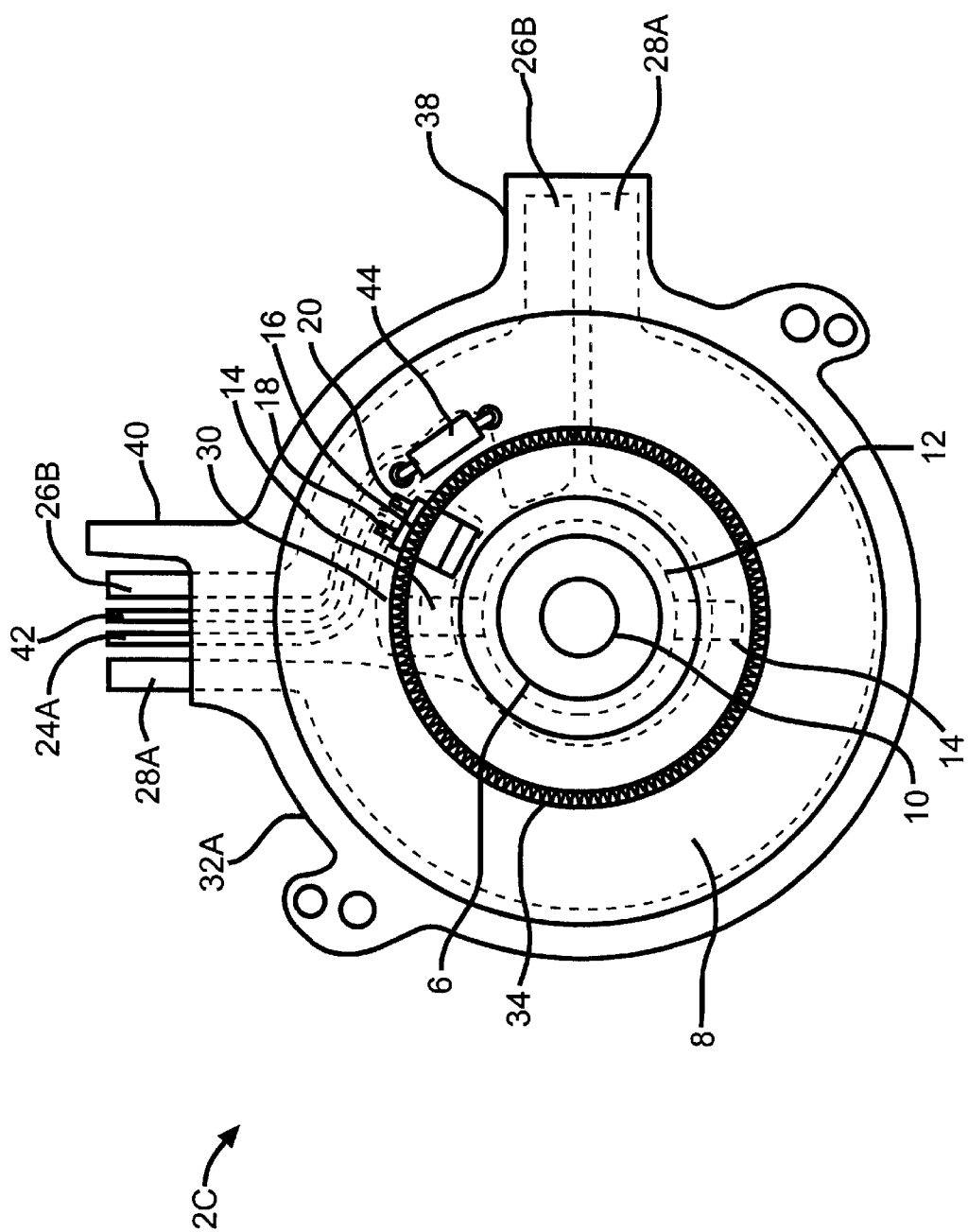
FIG. 5 is an end elevation view of a fourth embodiment of the electric motor shown in FIG. 1.

Referring to FIG. 5, the motor indicated generally at 2C contains many of the same elements as in FIGS. 3 and 4, including the power connector 38 and the integral motor connector 40, but the motor 2C further contains a current sensing resistor 44 that is mounted on the end plate 32A. The current sensing resistor 44 is electrically connected in series with the gate contact 20 of the motor driver transistor 16 (by a motor transistor current monitoring lead frame 42) and a ground lead frame 26B that terminates in both the power connector 38 and the integral motor connector 40. As in FIG. 3, the lead frame 30 electrically connects the case contact of the motor driver transistor 16 with one of the motor brushes 14, and a motor driver transistor control lead frame 24A is provided to connect the ECU (not shown) to the control contact 18 of the motor driver transistor 16. The ability to measure the current of the motor assists in diagnosis and enhances control of the motor under operating conditions.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. An end plate assembly for an electric motor comprising:
   a motor housing end plate having at least one projection extending therefrom;
   a bearing received in said end plate;
   a disk having an aperture formed through the center thereof, said disk received in said end plate with said bearing positioned in said aperture, said disk having at least four electrical conductors formed thereon, a first, second and third one of said electrical conductors having one end terminating in said one projection for connection to a motor control system;
   a shaft rotatably mounted in said bearing;
   a commutator attached to said shaft;
   at least two motor brushes mounted in said end plate and in electrical contact with said commutator, one of said brushes being electrically connected to said first electrical conductor and another of said brushes being electrically connected to a fourth one of said electrical conductors; and
   an electronic switching device mounted on said disk, said electronic switching device having a control contact and a ground contact electrically connected to said second and third electrical conductors respectively and having a case contact electrically connected to said fourth electrical conductor for controlling a flow of electrical current through said commutator.

2. The end plate assembly according to claim 1 wherein said electronic switching device is a motor driver transistor.

3. The end plate assembly according to claim 2 wherein said motor driver transistor is a field effect transistor.

4. The end plate assembly according to claim 2 wherein said motor driver transistor device is a bipolar junction transistor.

5. The end plate assembly according to claim 1 wherein said first electrical conductor is adapted to be connected to a positive potential from a power source, said second electrical conductor is adapted to be connected to a switching signal source, and said third electrical conductor is adapted to be connected to a ground potential of said power source.

6. The end plate assembly according to claim 5 including another projection extending from said end plate and wherein said first and third electrical conductors have another end terminating in said another projection.

7. The end plate assembly according to claim 6 wherein said another projection is a power connector for supplying electrical power from the power source and said one projection is a motor connector for exchanging signals with a motor control system.

8. The end plate assembly according to claim 7 wherein said fourth electrical conductor has one end terminating in said motor connector for connection to a diagnostic circuit for said motor.

9. The end plate assembly according to claim 7 including a current sensing resistor mounted on said disk and a fifth electrical conductor formed on said disk, said resistor being electrically connected in series between said ground contact of said electronic switching device and third electrical conductor, and said fifth electrical conductor having one end terminating in said motor connector for connection to a diagnostic circuit for said motor.

10. The end plate assembly according to claim 1 wherein said electrical conductors are included in a lead frame.

11. The end plate assembly according to claim 1 wherein said disk is operable as a heat sink for said electric motor.

12. An end plate assembly for an electric motor comprising:
    a motor housing end plate having at least one projection extending therefrom;
    a disk received in said end plate and having at least four electrical conductors formed thereon, a first, second and third one of said electrical conductors having one end terminating in said one projection for connection to a motor control system;
    at least two motor brushes slidably mounted in said end plate, one of said brushes being electrically connected to said first electrical conductor and another of said brushes being electrically connected to a fourth one of said electrical conductors; and
    an electronic switching device mounted on said disk, said electronic switching device having a control contact and a ground contact electrically connected to said second and third electrical conductors respectively and having a case contact electrically connected to said fourth electrical conductor for controlling a flow of electrical current through said brushes.

13. The end plate assembly according to claim 12 wherein said electronic switching device is a motor driver field effect transistor.

14. The end plate assembly according to claim 12 including a commutator rotatably mounted to said end plate and in electrical contact with said brushes.

15. The end plate assembly according to claim 12 including another projection extending from said end plate and wherein said first and third electrical conductors have another end terminating in said another projection.

16. The end plate assembly according to claim 15 wherein said another projection is a power connector for supplying electrical power from a power source and said one projection is a motor connector for exchanging signals with a motor control system.

17. The end plate assembly according to claim 16 wherein said fourth lead has one end terminating in said motor connector for connection to a diagnostic circuit for said motor.

18. The end plate assembly according to claim 16 including a current sensing resistor mounted on said disk and a fifth electrical conductor formed on said disk, said resistor being electrically connected in series between said ground contact of said electronic switching device and third electrical conductor, and said fifth electrical conductor having one end terminating in said motor connector for connection to a diagnostic circuit for said motor.

19. The end plate assembly according to claim 12 wherein said motor driver transistor is a field effect transistor.

20. The end plate assembly according to claim 12 wherein said motor driver transistor device is a bipolar junction transistor.

21. The end plate assembly according to claim 12 wherein said electrical conductors are included in a lead frame.

22. The end plate assembly according to claim 12 wherein said disk is operable as a heat sink for said electric motor.

* * * * *